INVENTOR.
GERALD H. ASKEW
BY

June 30, 1970 G. H. ASKEW 3,518,374

APPARATUS FOR SYNCHRONIZING MASTER AND SLAVE TELEVISION SYNC GENERATORS

Filed Oct. 5, 1966 5 Sheets-Sheet 2

INVENTOR.
GERALD H. ASKEW
BY
[signature]
AGENT

INVENTOR.
GERALD H. ASKEW
BY
AGENT

INVENTOR.
GERALD H. ASKEW
BY
AGENT

INVENTOR.
GERALD H. ASKEW
BY
[signature]
AGENT

United States Patent Office 3,518,374

Patented June 30, 1970

3,518,374

APPARATUS FOR SYNCHRONIZING MASTER AND SLAVE TELEVISION SYNC GENERATORS

Gerald Hamilton Askew, London, England, assignor, by mesne assignments, to U.S. Philips Corporation, New York, N.Y., a corporation of Delaware Filed Oct. 5, 1966, Ser. No. 584,538

Claims priority, application Great Britain, Oct. 6, 1965, 42,394/65

Int. Cl. H04n 5/04

U.S. Cl. 178—69.5 8 Claims

ABSTRACT OF THE DISCLOSURE

The present invention relates to synchronizing a slave television apparatus as soon as possible after the synchronizing signal from a master television apparatus has been received. The apparatus comprises an auxiliary comparison stage having two output terminals, and producing a correction signal from one output if the pulses from the slave lead the pulses from the master or a correction signal from the other output if the pulses from the master lead the slave pulses. The output signals are applied to an oscillator of the slave generator so as to slow down or to speed up respectively its pulse repetition rate until pulses of master and slave generator are in synchronism.

The invention relates to television apparatus for the synchronisation of slave apparatus to master apparatus therein.

Where the slave apparatus generates its own synchronising waveform a problem arises where it is desired to lock the slave apparatus to a master apparatus, which has its own synchronising waveform, in such manner that field synchronising pulses of the slave apparatus occur at the same time as field synchronising pulses of the master apparatus.

When an interlaced field television system is used wherein each frame consists of an odd field and an even field, a further problem may arise where it is required that odd and even field synchronising pulses of the master apparatus shall occur at the same time as corresponding (odd or even) pulses of the slave apparatus.

This problem has clearly been described in U.S. Pat. 2,570,775. It is due to the fact that in camera equipment the main oscillator delivers a signal having the double horizontal frequency $2f_h$. This frequency $2f_h$ is divided on the one hand by 2 thus delivering the horizontal frequency $f_h$. On the other hand it is divided to such an extent that the field frequency $f_f$ is obtained. This frequency $f_f$ is compared in a comparison stage with another one, for example, the frequency $f_f'$ of the mains or another reference standard and the regulating voltage obtained from said comparison circuit is used to control the main oscillator. It is also possible, as will be explained hereinafter, that a field oscillator is controlled by means of a regulating voltage obtained from the comparison stage.

However, when the slave camera equipment has to be faded in with the master equipment the only way to synchronize the slave apparatus is the regulating voltage for controlling the main or the field oscillator. Then the field pulses obtained from the master equipment has to be used for obtaining said regulating voltage. However, then the problem arises that not the field frequency itself can be used directly, due to the interlace principle of the television systems used nowadays. Therefore a signal with half the field frequency $f_f/2$ must be used being either the odd or the even field pulses.

The present invention has for its object to synchronize the slave apparatus as soon as possible after the synchronizing signal from the master apparatus has been received. Therefore, the television apparatus in accordance with the invention is characterized in that the apparatus comprises an auxiliary comparison stage $C_a$ having two output terminals X and Y and producing an X correction signal output if the pulses from the slave lead the pulses from the master or a Y correction signal output if the pulses from the master lead the slave pulses, said X and Y signal being suitable for application to an oscillator ($O_{s1}$ or $FO_{s1}$) of the slave generator so as to slow down or to speed up respectively its pulse repetition rate until pulses of master and slave generator are in synchronism, the comparison stage $C_a$ comprising a first bistable circuit 12 having its output connected to an X output terminal, a second bistable circuit having its output connected to a Y output terminal, a first input terminal connected to a set terminal of the first bistable and adapted for receiving field synchronizing pulses from said slave generator, a second input terminal connected to a set terminal of the second bistable and adapted for receiving field synchronizing pulses from said master generator, and an AND gate connected between the X and Y output terminals, and a reset coupling from the output of said AND gate to the reset terminals of both of said bistable circuits respectively.

It may be remarked that in order to synchronize the slave as soon as possible digital circuits are used having two outputs X and Y as said hereinbefore. Moreover, the low-pass filters as present at said outputs have time constants which are as low as possible. They are only necessary to prevent undesired noise signals coming through.

It is sometimes desirable to pair off slave and master pulses which are nearer to each other in time so that the smaller starting error occurs prior to correction. This allows locking to be achieved more rapidly.

In the case of field sync pulses of an interlaced television system, it is desirable to compare frame with frame, i.e. an odd field of a first source A with an odd field of a second source B, etc. As described hereinbefore a simple comparison of field pulses is not adequate for this purpose.

In other television cases field comparison may be used, i.e. an "A" field is compared with the nearest "B" field regardless of whether it is even or odd. This has the advantage that the maximum error possible is one half of a field period so that the time taken to achieve locking will be less (i.e. ½) under similar conditions.

The embodiment described below provides means for comparing slave pulses supplied to input A with master pulses supplied to input B in either of these ways, the mode being selected by the throw of a multiple switch.

It is a further feature of the embodiment to provide the correction signal resulting from the comparison in either of two forms. In a first form, for use in a servo of the digital type (i.e. one which employs corrections by fixed amounts), the signals X and Y may be used as instructions to respectively slow down or speed up the slave signal A by a fixed amount. In the case of no signal at X or Y, no change of speed is commanded so that this operates as a three-level control signal. This may be effected directly by X and Y, or preferably via additional circuit means by which signals X and Y of less than a chosen duration are ignored.

In a second form, for use in an analogue type of servo, a single signal proportional to the phase error is obtained from signals X and Y, e.g. in a converter stage which will also be described.

A preferred embodiment of the invention will now be described by way of example with reference to the accompanying drawings, wherein:

FIG. 4 and 5 show waveforms related to FIG. 3, while

Figure 1:
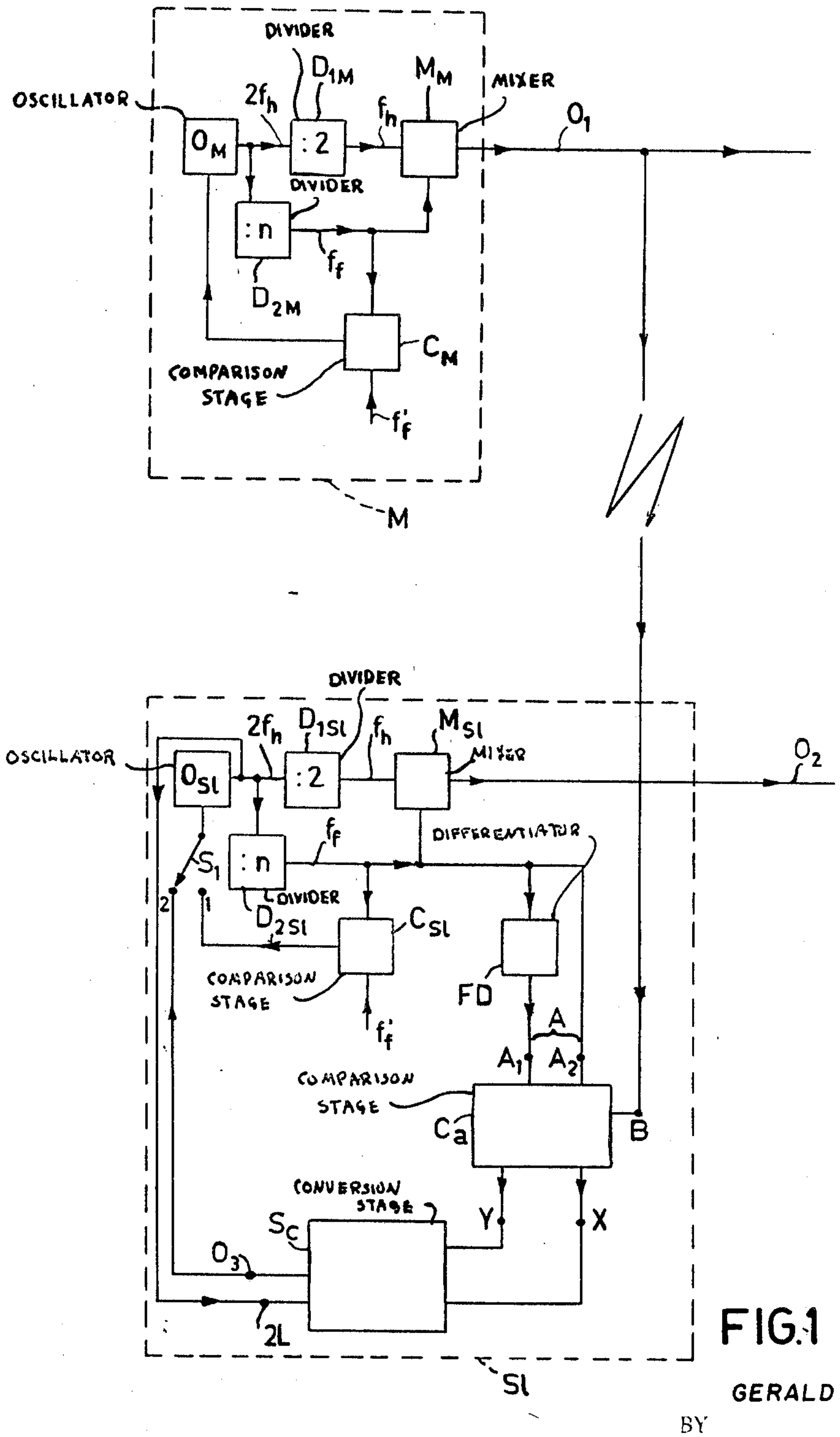
FIG. 1 shows a first block diagram of master and slave apparatus in which a synchronizing circuit in accordance with the invention can be used for locking the slave apparatus to the master synchronizing signal in which the main slave oscillator is controlled.

In the block diagram of FIG. 1 there is shown a master apparatus M for the delivering of the total master synchronizing signal at output terminal $O_1$. Said master pulse generator comprises a controlled main oscillator $O_M$ delivering a signal with twice the line frequency $2f_h$ for the television system in use. For example, in the CCIR system, with 625 lines per raster, $2f_h=31{,}250$ c./s. The output signal of main oscillator $O_M$ is applied to a first dividing $D_{1M}$ dividing the frequency $2f_h$ by a factor 2 therefore delivering at its output a signal with line frequency $f_h$. In the CCIR system $f_h=15{,}625$ c./s.

The signal from oscillator $O_M$ is also applied to a second dividing stage $D_{2M}$ having a dividend $n$ and delivering at its output a signal with the field frequency $f_f$. For the CCIR system $f_f=50$ c./s., giving $n=625$.

The output signals of both dividing stages $D_{1M}$ and $D_{2M}$ are applied to mixing stage $M_M$ delivering at its output $O_1$ the master synchronizing signal. It will be evident that, although not shown, blanking and equalisation pulses may be applied to said mixing stage thereby ensuring that these signals are also present in the master synchronizing signal. This master synchronizing signal can be used in the master apparatus as well as other signals such as line, field and blanking pulses. However, the use of these signals is of no importance for the present invention and therefore not shown in the diagram of FIG. 1.

In FIG. 1 there is also shown a comparison stage $C_M$ in the master apparatus M. To this comparison stage $C_M$ there is applied the field signal from second dividing stage $D_{2M}$ and a reference signal with a frequency $f_f'$ which is equal to the desired field frequency. From the comparison stage $C_M$ there is applied a regulating voltage to the controlled oscillator $O_M$. It will be evident, however, that if in the main master oscillator $O_M$ there is used a crystal oscillator the comparison stage with reference $f_f'$ can be avoided as shown for the master pulse generator M of FIG. 2.

The slave apparatus S*l* as shown in FIG. 1 is also intended to deliver synchronizing signals at its output $O_2$. However, as said in the preamble, the slave pulse generator S*l* should be able to operate on its own that means without any synchronizing signal, as well as a slave apparatus, in which case a synchronizing signal from the master apparatus M is applied to its input terminal B. The transmission of said synchronizing signal from output $O_1$ of the master M to input B of the slave S*l* can be done either by cable or over the air.

The slave S*l* comprises a main oscillator $O_{sl}$ delivering a signal with twice the line frequency $2f_h$. It also comprises a first dividing stage $D_{1sl}$ delivering an output signal with line frequency $f_h$ and a second dividing stage $D_{2sl}$ delivering a signal with the field frequency $f_f$. The two outputs of dividing stages $D_{1sl}$ and $D_{2sl}$ are applied to mixing stage $M_{sl}$ for delivering a total slave synchronizing signal at its output $O_2$ in the same manner as mixing stage $M_M$ of the master delivers a signal at its output $O_1$.

The slave pulse generator S*l*, moreover, comprises a comparison stage $C_{sl}$ to which are applied the output signal of second dividing stage $D_{2sl}$ and the reference signal with frequency $f_f'$. So comparison stage $C_{sl}$ delivers at its output connected to contact 1 of switch $S_1$ a regulating voltage which when contact 1 is closed is applied to the controlled main slave oscillator $O_{sl}$. So if slave apparatus S*l* has to operate on its own switch $S_1$ is set in the position for connecting contact 1 to the oscillator $O_{sl}$.

However, if the slave has to be locked to the master switch $S_1$ has to be set in a position connecting contact 2 with oscillator $O_{sl}$, for it will be evident to those skilled in the art that references $f_f'$ of master and slave must not be equal to each other under all circumstances.

Therefore the slave apparatus S*l* further comprises a field differentiator circuit FD, an additional comparison stage $C_a$ and a conversion stage $S_c$.

Figure 2:
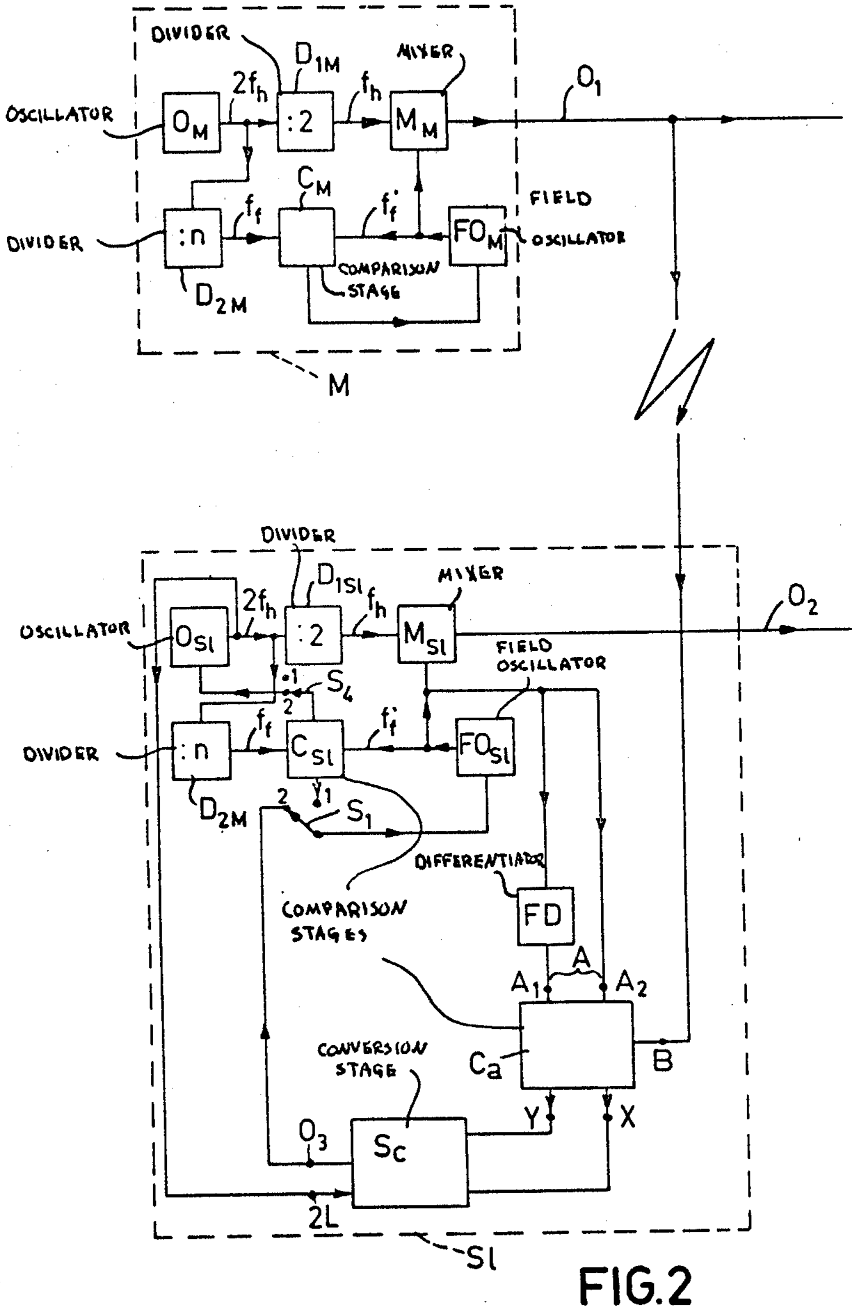
FIG. 2 shows a second block diagram for the same purpose in which, however, the field slave oscillator is controlled.

The field differentiator circuit FD is known in the art (see for example the field differentiator 65 in FIG. 2 of U.S. Pat. 2,570,775). The field differentiator circuit FD receives at its input terminal the field synchronizing pulses from second dividing stage $D_{2sl}$. At its output it delivers odd or even field synchronizing pulses having half the frequency $f_f/2$ as the field frequency $f_f$. In this embodiment odd field synchronizing pulses are used, but it will be evident that also even pulses can be used for input terminal $A_1$ of additional comparison stage $C_a$.

In accordance with the invention a new comparison stage $C_a$ is included in the slave apparatus S*l*. Stage $C_a$ which will be described more fully hereinafter with the aid of FIG. 3, has an input A provided by a pair of links $A_1$ and $A_2$. Link $A_1$ is connected to the output of field differentiator FD and delivers odd field synchronizing pulses with frequency $f_f/2$ to stage $C_a$. Link $A_2$ is directly connected to second dividing stage $D_{2sl}$ and delivers odd and even field pulses. Therefore the signal at terminal $A_2$ has the field frequency $f_f$.

Comparison stage $C_a$ has two output terminals X and Y which are connected to the two input terminals of convertor stage $S_c$. The output $O_3$ of stage $S_c$ is connected to contact 2 of switch $S_1$. Conversion stage $S_c$ has been shown in more detail in FIG. 6. It delivers at its output $O_3$ a signal for speeding up or delaying the main slave oscillator $O_{sl}$ as desired.

In FIG. 2, in which identical parts are indicated with the same labels as in FIG. 1, the main oscillators $O_M$ and $O_{sl}$ are in general not controlled crystal oscillators having such a good frequency stability that under normal conditions no frequency control of these oscillators is necessary. Therefore the master oscillator $O_M$ is completely free running whereas the slave oscillator $O_{sl}$ is only controlled when generator lock from the master is desired.

As shown in FIG. 2 the field frequency from second dividing stage $D_{2M}$ is compared in comparison stage $C_M$ with a field frequency $f_f'$ of a signal obtained from master field oscillator $FO_M$. As shown in FIG. 2 the regulating voltage obtained from comparison stage $C_M$ is fed back to field oscillator $FO_M$ in order that there is a fixed relation between line and field synchronizing pulses. In the embodiment of FIG. 2, the field synchronizing pulses for mixing stage $M_M$ are obtained from field oscillator $O_M$. It will be evident, however, that these pulses can also be obtained from dividing stage $D_{2M}$. In that case field oscillator $FO_M$ and comparison stage $C_M$ can be avoided.

In the slave apparatus also a slave field oscillator $FO_{sl}$ is present and functions together with the slave comparison stage $C_{sl}$ in the same manner as in the master apparatus. However, in the slave comparison stage $C_{sl}$ has two output terminals. One is connected to contact 1 of switch $S_1$, the other to the switching arm of switch $S_4$. When the slave should operate on its own, switches $S_1$ and $S_4$ are connected to contact 1. Then it will be evident that the slave pulse generator S*l* functions in the same manner as master pulse generator M. However, when slave S*l* should be locked to the master synchronizing signal received at terminal B, then switches $S_1$ and $S_4$ are connected to contacts 2. In that case the regulating voltage for the slave field oscillator $FO_{s1}$ is obtained from output $O_3$ of the conversion stage $S_c$ through contact 2 of switch $S_1$ for speeding up or delaying field oscillator $FO_{s1}$ as desired. Then the fixed relation between line and field synchronizing pulses of the slave generator S1 must be restored by applying the regulating voltage from comparison stage $C_{s1}$ also to main oscillator $O_{s1}$ through contact 2 of switch $S_4$.

It may be remarked that although in the embodiments of FIGS. 1 and 2 the main oscillators $O_M$ and $O_{s1}$ deliver signals with frequency $2f_h$ it will be clear that also signals with a frequency being a multiple of said double line frequency, for example a frequency $m \cdot 2f_h$, $m$ being a whole number, can be delivered by said oscillators. In that case only an additional dividing stage with dividend $m$ has to be included between oscillator $O_M$ respectively $O_{s1}$ and first dividing stage $D_{1M}$ respectively $D_{1s1}$. Then the output of said additional dividing stage can also be used as an input for terminal 2L of conversion stage $S_c$ Now turning to FIG. 3, which gives the comparison stage $C_a$ of FIGS. 1 and 2 in more detail, there is shown the input A with the links $A_1$ and $A_2$.

Link $A_2$, connected to contact 2 of switch 10, carries both odd and even field pulses. The other link $A_1$, connected to contact 1 of switch 10, carries odd pulses only. A further input (the B input) is provided by a single link carrying odd and even field pulses supplied or derived from a master field synchronising pulse generator (not shown) plus line pulses. That is to say at input B the normal synchronizing signal as obtained from the master is present.

The two links $A_1$ and $A_2$ are taken to the alternative switch positions "1"–"2" of a changeover switch 10, the changeover arm being connected to the "set" input 11 of a bistable circuit 12. Circuit 12 has a "reset" input 13 and an output 14 which is connected to the input 15 of a low-pass or smoothing filter 16 the output terminal of which is denoted by X. Output 14 is also linked to one input 17 of an AND circuit 18 having an output 19 and a second input 17'. The output 19 is led to one input 20 of an OR circuit 21 having a second input 22 and two outputs 23, 24. Output 23 is led to the reset input 13 of bistable circuit 12.

The B input terminal of comparison stage $C_a$ (carrying odd and even master field pulses) is taken to one switch position "2" of a changeover switch 30, and a branch 31 from the B terminal is taken to the input 32 of an odd/even field pulse separator device 33 which separates out even field pulses to be supplied to a first output 34 and odd field pulses to be supplied to a second output 35. Output 35 has a link to switch position "1" of switch 30. The changeover arm of switch 30 is connected to the "set" input 36 of a bistable circuit 37. Circuit 37 has a "reset" input 38 connected to a second output (24) of OR circuit 21, and an output 39 which leads to the input 40 of a low-pass or smoothing filter 41 the output of which filter leads to a terminal Y. Output 39 is also linked to second input 17' of AND circuit 18. The device 33 can be of the form of a field differentiator, as shown in FIG. 2 in U.S. Pat. 2,570,775, wherein the total synchronizing signal is coming in and whereby only even field pulses are coming out. It will be evident that in an analogous manner odd field pulses can be obtained.

Switches 10 and 30 are mechanically ganged together and with a third changeover switch 50 (see the dotted lines between switches 10, 30 and 50) so that all switches are either in the "1" positon or else the "2" position. Switch 50 has its "1" position supplied from output 34 of odd/even separator 33. The 2 position of switch 50 is supplied (via line 51) with odd and even field pulses delayed by one half of the field duration (e.g. 10 milliseconds for a 50 c./s. field frequency) by a delay device 54. The input 55 of device 54 is linked to position "2" of switch 10 which carries both odd and even slave field pulses.

Figure 3:
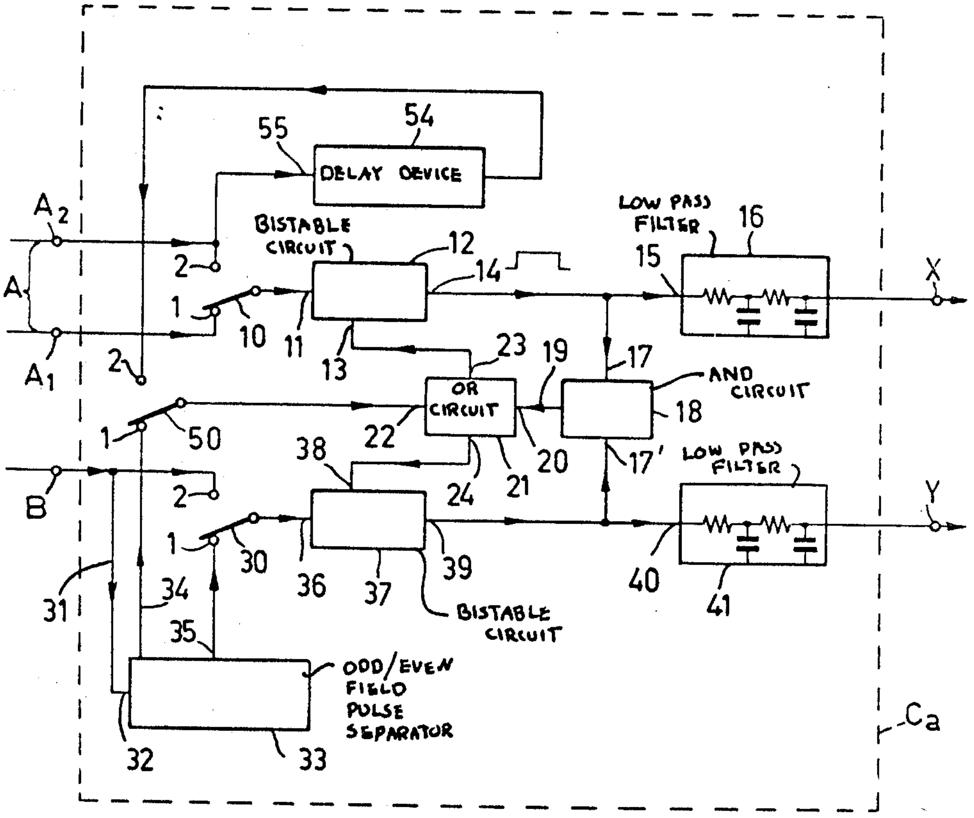
FIG. 3 shows schematically the elements of the comparison stage in accordance with the invention.

The arrangement of FIG. 3 operates so as to compare slave field pulses supplied to input A with master field pulses supplied to input B. This comparison stage $C_a$ produces output signals at X or Y indicative of the relative lead or lag of the slave field pulses with reference to master field pulses. It is desirable (as aforesaid) to pair off slave and master field pulses which are nearest each other in time so that the smaller starting error occurs prior to correction thus allowing locking to occur as soon as possible.

As stated above, it is desirable to lock frame to frame, i.e. the odd field of A must occur at the same time as the odd field of B, etc. A simple comparison of field pulses is not adequate for this purpose, but frame-to-frame comparison can be achieved by this circuit with the switches in position "1" as shown.

The operation of the circuit of FIG. 3 will now be explained. Separator 33 produces pulses at frame intervals from the master B input, and FIG. 3 shows means whereby the frame-to-frame correspondence of these pulses from A and B may be achieved with the switches in position "1." If, however, it is only required to produce a correspondence between field pulses irrespective of whether they are odd or even, the switches are set to position "2."

Figure 4:
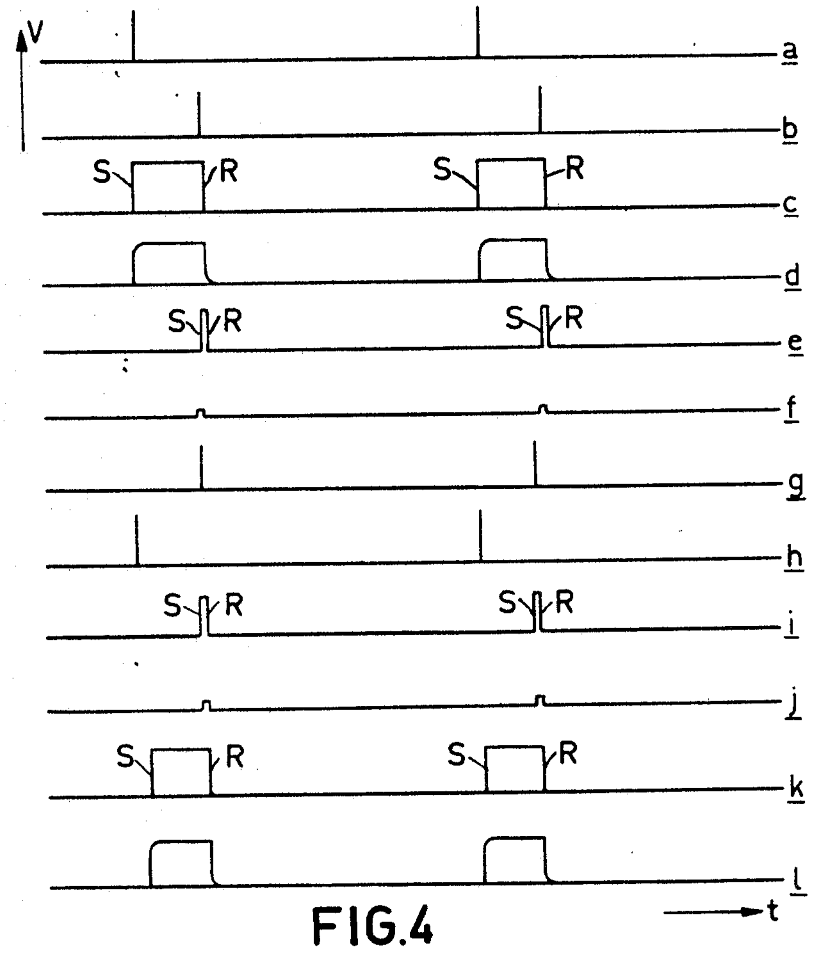

The operation in position "1" of the switches 10, 30 and 50 will first be described with reference to the waveforms shown in FIGS. 4 and 5 of the drawings.

A pair of pulses (both odd) at inputs 11 and 36 set the bistable circuits 12 and 37 respectively. If the pulse at terminal 11 (waveform *a*) arrives first, bistable 12 is set (waveform *c* front flank S). When the pulse at terminal 36 (waveform *b*) arrives bistable 37 is set (waveform *e* front flank S). Then a signal at terminal 17 and a signal at terminal 17' of AND circuit 18 is present and therefore through the OR circuit 21 both bistable circuits 12 and 37 are reset. Due to the natural delay of such circuits said resetting takes some time so that the reset flank (rear flank R of pulses in waveforms *c* and *e*) occurs somewhat later than the pulses at terminal 36. The output at terminal X (waveform *d*) is practically the output signal of bistable 12 and is the measure of the magnitude of the time difference of pulses from A and B. There is substantially no signal at terminal Y (waveform *f*) as the filter 41 removes the short spike (waveform *e*) due to the fact that setting and resetting of bistable 3 only depends upon said natural delay.

A similar condition exists when the pulses at terminal 36 arrive first. This is shown in FIGS. 2*g* to 2*l* respectively whereby waveform *g* shows the odd pulses at terminal 11, waveform *h* shows the odd pulses at terminal 36, waveform *i* shows the output signal of bistable 12, waveform *j* shows the signal at terminal X waveform *k* shows the output signal of bistable 37 and waveform *l* shows the signal at terminal Y.

When comparing waveform *d* (at terminal X) with waveform *l* (at terminal Y) it is seen that when the pulses at terminal 11 lead the pulses at terminal 36 practically an identical signal is obtained at terminal X as at terminal Y when pulses at terminal 36 lead pulses at 11. However, it can be shown with the aid of FIG. 6 that the waveform *d* can be used to slow down the main slave oscillator $O_{s1}$ or the field slave oscillator $FO_{s1}$, whereas the waveform *l* can be used to speed them up, thereby slowing down or speeding up the odd field pulses derived from the main slave oscillator $O_{s1}$, or from the field slave oscillator $FO_{s1}$.

The above described operation is based on the assumption that the odd field pulses initially selected for pairing off happen to be nearer in time than one half of a frame interval. If this is not so, then there is a more satisfactory mode of operation by reselecting pairs of pulses which are nearer in time than half a frame interval.

Figure 5:
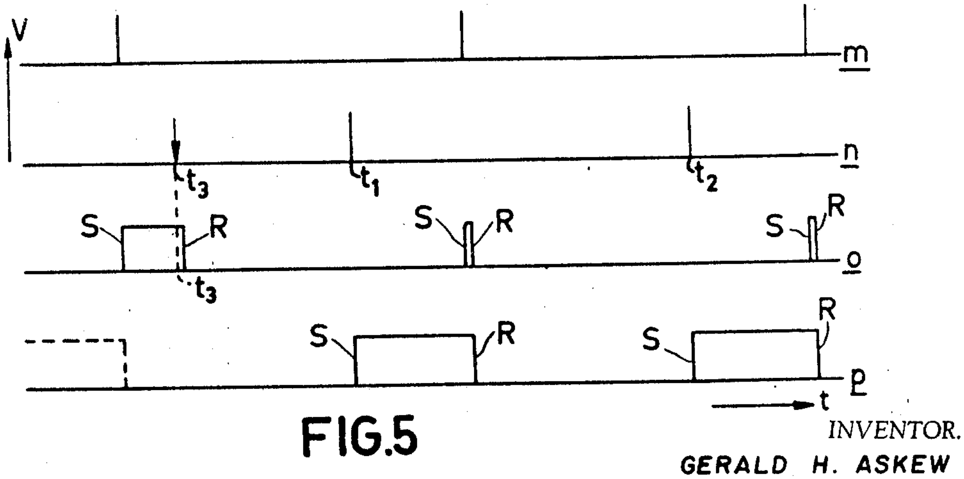

This can be explained with the aid of FIG. 5. In FIG. 5 waveform (*m*) there are again shown the odd field pulses as present on "set" input terminal 11. In FIG. 5 waveform ($n$) there are shown the odd field pulses at "set" input terminal 36 at instants $t_1$ and $t_2$. In said waveform ($n$) there is also shown at instant $t_3$ the even field pulse occurring at input 22 of OR circuit 21.

Then the first odd pulse at terminal 11 sets the bistable 12. The even pulse present at instant $t_3$ at terminal 22 resets the bistable 12 through the OR circuit, because such an OR circuit delivers a pulse at its output terminals 13 and 24 when a signal at input terminal 22 or a signal at input terminal 20 is present. Therefore, taken into account the small natural delay time as mentioned above, the output of bistable 12 is as shown by the first pulse (shown around instant $t_3$) in waveform $o$. Therefore an output signal will be present at terminal X which is practically identical (compare also waveforms $c$ and $d$ of FIG. 4) as said first pulse of waveform $o$ and has the effect of slowing down the oscillators $O_{s1}$ or $FO_{s1}$. Therefore the time interval between Odd-Pulses on terminal 11 and Odd-Pulses on terminal 36 is increased. Now the first Odd-Pulse present at instant $t_1$ at terminal 36 sets bistable 37 (front flank S in waveform $p$). The Odd-Pulse occurring thereafter at terminal 11 (second pulse of waveform $m$) sets bistable 12 so that, due to natural delay through AND 18 and OR circuit 21 both bistables are reset (rear flank R of waveforms $o$ and $p$). Due to the above-mentioned increase between the Odd-Pulses on terminals 11 and 36 the duration of the pulses present at the output of bistable 37 (waveform $p$) is also increased. Because pulses with practically the same duration are also present at terminal Y and because these pulses have the effect of speeding up oscillators $O_{s1}$ and $FO_{s1}$ the time for said speeding up is also increased as when compared with the case that no even pulses would be applied to the OR circuit 21. So the supply of said even-pulses has for effect that bringing into synchronism is ensured by adding OR circuit 21 and applying even pulse from output 34 to input 22. Otherwise the duration of pulses at terminal Y may be too small in order to ensure enough speeding up of said oscillators to ensure synchronism under all circumstances. The OR gate 21 is necessary since resetting of both bistables must take place in response to the second pulse of a pair or a terminating pulse from the AND gate 18. It will be evident, however, if that larger security for bringing the circuit in synchronism is not desired, the output 34 and OR gate 21 can be omitted.

Obviously, the same function may be achieved by interchanging odd and even pulses throughout.

Operation in position "2" of the switches will now be described. In position "2" the operation resembles that described for FIG. 3 except that the time scale is halved, since frame pulses with frequency $f_f/2$ now become field pulses with frequency $f_f$. Thus the waveforms of FIG. 4 apply with A-odd/B-odd becoming A-odd-and-even/B-odd-and-even. Since both odd and even pulses are now used, the separator 33 can no longer provide half-way pulses for input 22 to the OR gate, but this may be achieved by use of a 10 millisecond delay 54 if $f_f$=50 c./s. By this means a pulse is produced about half-way between field pulses which pulse is used to ensure pairing for the smaller phase error, as before. The waveforms of FIG. 5 apply if (1) A and B are interchanged, (2) "odd" is replaced by "odd and even" and (3) "B even" (occurring at instant $t_3$ in waveforms $n$) replaced by "delayed A pulse" . . . . It is not vital that the delay be exactly one half of a field period, as this will merely slightly increase the maximum error, and hence the locking time.

It will be noted that the system is not perfectly symmetrical. Complete symmetry might be achieved by use of two odd/even separators and two 10 msec. delays. However, this is not necessary. In fact, although the asymmetrical system is less accurate in the "smaller phase error" measurement when there is a difference in frequency between the signals A and B, such reduced accuracy is usually not important, as the "smaller phase error" information is only significant during the final stage of pull-in (when the frequencies are close).

The circuit described may be used with either a digital or an analogue servo. In general, an output at X is an instruction to slow down the local signal, while one at Y is an instruction to speed up of the local signal.

Figure 6:
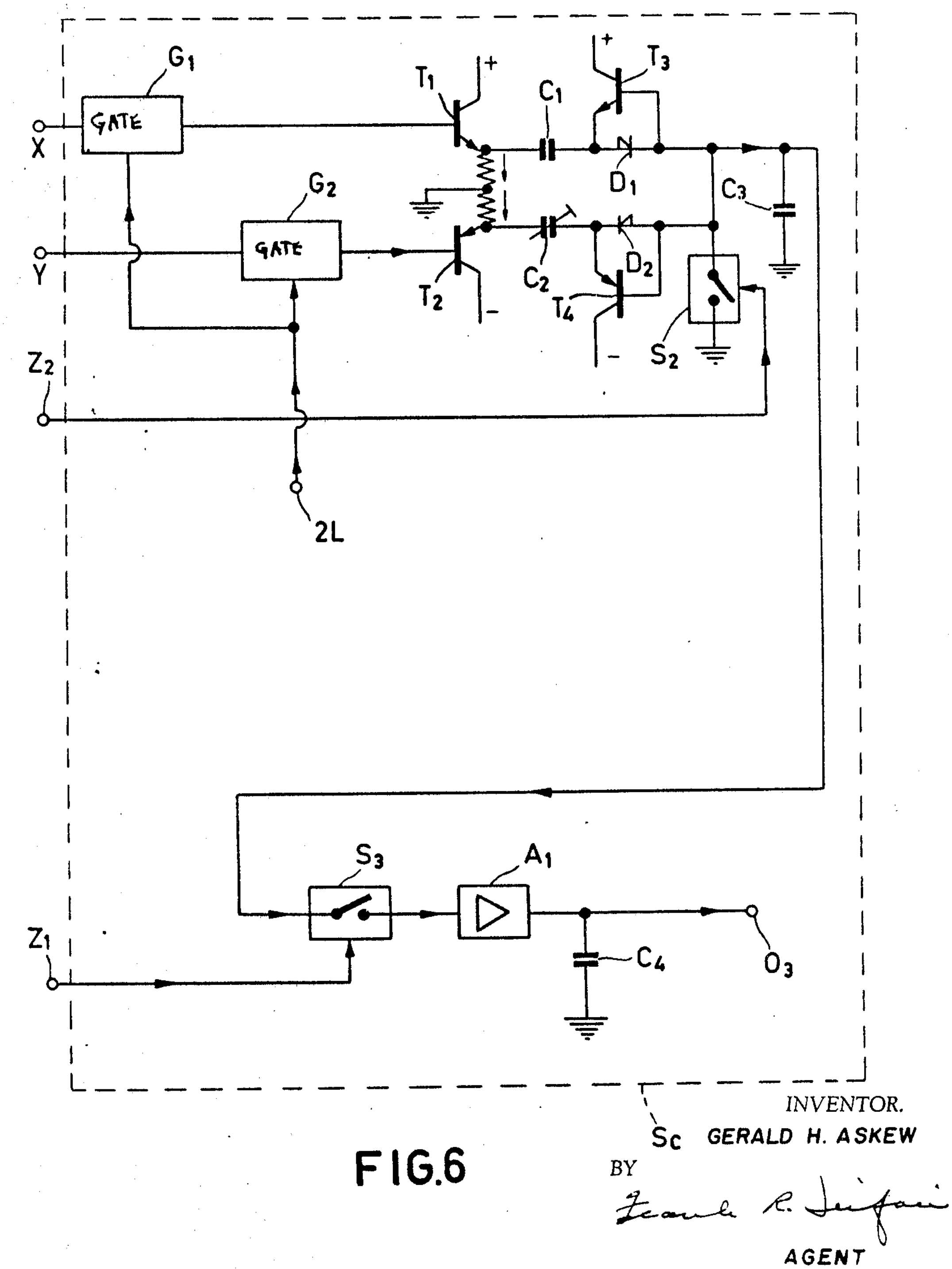
FIG. 6 shows schematically the elements of a stage for converting the two output signals X and Y of the comparison stage of FIG. 3 into a single output signal for controlling the main or the field slave oscillator.

In FIG. 6 there is shown the conversion stage $S_c$ of FIGS. 1 and 2 in more detail. The X terminal from comparison stage $C_a$ is connected to gate $G_1$ and the Y terminal to gate $G_2$.

To these two gate circuits are also applied pulses with twice the line frequency $2f_h$ as obtained through input terminal 2L from oscillator $O_{s1}$. Now if a signal is present at the X terminal (waveform $d$ for example) transistor $T_1$ conducts causing through capacitor $C_1$ that transistor $T_3$ and diode $D_1$ of diode pump circuit $T_3$, $D_1$ also conduct. This causes a current to flow from the positive voltage applied to the collector of transistor $T_3$ through $D_1$ and capacitor $C_3$. Therefore the voltage across capacitor $C_3$ rises in the positive direction. Thereafter switch $S_2$ is closed, discharging capacitor $C_3$. Switch $S_2$ may be driven by a pulse applied to terminal $Z_2$. Therefore a voltage is obtained across capacitor $C_3$ rising in the positive direction for the duration of the pulses present at terminal X. The voltage across $C_3$ is applied through closed switch $S_3$, which is controlled by a pulse obtained from terminal $Z_1$, and amplifier $A_1$ to output terminal $O_3$ for slowing down oscillator $O_{s1}$ or $FO_{s1}$. It will be evident that when pulses are present at terminal Y transistor $T_2$ conducts and via capacitor $C_2$ also diode pump circuit $D_2$, $T_4$. So a current is flowing from earth through capacitor $C_3$, diode $D_2$ and transistor $T_4$ to the negative voltage at the collector of transistor $T_4$. So a voltage rising in the negative direction is developed across capacitor $C_3$ which when arriving through $S_3$ and $A_1$ at output $O_3$, has for effect a speeding up of oscillator $O_{s1}$ or $FO_{s1}$.

The gating pulses from terminal 2L are used for chopping action so that large AC amplification through transistor $T_1$ or transistor $T_2$ is possible. It will be evident, however, that the pulses present at X or Y respectively can also be used directly for having the voltage across capacitor $C_3$ varying in positive or negative directions respectively.

By this means a pseudo-analogue servo operation may be obtained. Thus with a 625 line system using 2L pulses in position "1," the worst case of a 180° phase error between the A and B pulses causes a converted signal made up of 625 steps; in position "2" the signal is made up of 312½ steps.

One of the correction on control inputs X—Y permits 2L pulses to pass for a period equal to the difference in time of the field signals being compared. One or other of the diode pump circuits operates (in known manner) to charge $C_3$ either positively (X present) or negatively (Y present) by an amount proportional to the number of pulses passed (capacitors $C_1$ and $C_2$ are much smaller than $C_3$). Capacitor $C_2$ may be adjusted so that the sensitivity to Y signals is the same as for X signals.

A switching input $Z_2$ will cause $S_2$ to close and $C_3$ to be discharged via $S_2$ at some time after signal X (or Y) has ceased and after the signal on $C_3$ has been copied out for use in the servo.

The diagram illustrates a simple known way of storing the measured signal. The amplifier $A_1$ serves to prevent discharge of $C_3$ when the signal is copied on to $C_4$ via switch $S_3$ under the control of a switching waveform $Z_1$.

Thus a new measure appears on $C_4$ soon after the end of the second pulse of an A–B pair.

Pulse $Z_1$ and $Z_2$ may be provided as consecutive pairs by two monostable multivibrators in series, the first driven by the AND gate of FIG. 3 and producing pulse $Z_1$, the second being driven by the first to give a consecutive pulse $Z_2$. This is by way of convenient example only, there being other ways of achieving the same ends.

In the above description, the terms "master" and "slave"

have been used, by which is normally implied that the control signal derived is used to effect changes in the latter (i.e. slave) source of signals. However, this limitation of the roles of A and B does not apply to the invention so that A may equally well be the master and B the slave.

The different inputs of A and B in FIG. 3 are typical of the case in which A is a local source of pulses while B is remote, but this restriction is also unnecessary. In cases where A-odd pulses are not available a second separator may be used for A as for the B pulses. (This reason for a second separator is distinct from that discussed under asymmetry.)

I claim:

1. Television apparatus for the synchronization of master apparatus to slave apparatus for determining the relative timing difference between field synchronizing pulses from a master pulse generator and field synchronizing pulses having at least approximately the same repetition frequency from a slave pulse generator, characterized in that the apparatus compirses an auxiliary comparison stage having two output terminals X and Y and producing an X correction signal output if the pulses from the slave lead the pulses from the master or a Y correction signal output if the pulses from the master lead the slave pulses, said X and Y signals being suitable for application to an oscillator of the slave generator so as to slow down or to speed up respectively its pulse repetition rate until pulses of master and slave generator are in synchronism, the comparison stage comprising a first bistable circuit having its output connected to an X output terminal, a second bistable circuit having its output connected to a Y output terminal, a first input terminal connected to a set terminal of the first bistable and adapted for receiving field synchronizing pulses from said slave generator, a second input terminal connected to a set terminal of the second bistable and adapted for receiving field synchronizing pulses from said master generator, and an AND gate connected between the X and Y output terminals, and a reset coupling from the output of said AND gate to the reset terminals of both of said bistable circuits respectively.

2. A television apparatus as claimed in claim 1 characterized in that the reset coupling includes an OR gate between the AND gate and the bistable circuits, the connection to the AND gate constituting one input of the OR gate, the other input of the OR gate being connected to means for supplying field pulses which are approximately spaced half-way in time between the input field pulses from the slave or master generator, and the outputs of the OR gate being connected to the reset terminals of the two bistable circuits.

3. A television apparatus as claimed in claim 2 characterized in that the television system for which the apparatus is intended is an interlaced system and wherein odd fields are compared with odd fields only or even fields are compared with even fields only, and wherein the half-way pulses supplied to the OR gate are of the other kind, i.e. even or odd respectively.

4. A television apparatus as claimed in claim 2, characterized in that the half-way pulses supplied to the OR gate are obtained from the input pulses of the slave apparatus with the aid of a delay line.

5. A television apparatus as claimed in claim 4 characterized in that the television system for which the apparatus is intended is an interlaced system and wherein the inputs to the set terminals of each of the bistables both contain odd and even field pulses and the delay period corresponds to approximately half a field period.

6. A television apparatus as claimed in claim 2 characterized in that the comparison stage comprises switching means for switching the comparison stage from a configuration in which lines of the same kind are compared to one in which both odd and even lines are compared.

7. A television apparatus as claimed in claim 1, characterized in that the apparatus comprises a converter stage having two input terminals connected to the input terminals X and Y of the comparison stage for converting the X and Y outputs from pulses having constant amplitudes and variable duration to a single signal having a variable amplitude proportional to said duration and a changing polarity representative of X or Y.

8. A television apparatus as claimed in claim 7, characterized in that said single output signal is used for correcting the frequency and/or phase of an oscillator of the slave generator in response to the output signal or signals derived from the said X and Y output terminals respectively.

References Cited

UNITED STATES PATENTS 3,047,658 7/1962 March -------------- 178—69.5

ROBERT L. GRIFFIN, Primary Examiner

R. L. RICHARDSON, Assistant Examiner